United States Patent [19]

Raychaudhuri et al.

[11] Patent Number: 5,638,371
[45] Date of Patent: Jun. 10, 1997

[54] MULTISERVICES MEDIUM ACCESS CONTROL PROTOCOL FOR WIRELESS ATM SYSTEM

[75] Inventors: Dipankar Raychaudhuri, Princeton Junction; Hai Xie, Highland Park; Ruixi Yuan, Plainsboro, all of N.J.

[73] Assignee: NEC USA, Inc., Princeton, N.J.

[21] Appl. No.: 495,164

[22] Filed: Jun. 27, 1995

[51] Int. Cl.$^6$ ..................................................... H04J 3/16
[52] U.S. Cl. .......................... 370/347; 370/349; 370/395
[58] Field of Search ........................... 370/60, 60.1, 58.1, 370/58.2, 58.3, 94.1, 85.7, 94.2, 95.1, 95.2, 95.3, 85.2; 455/33.1, 54.1, 54.2; 379/59, 60

[56] References Cited

U.S. PATENT DOCUMENTS

| | | | |
|---|---|---|---|
| 4,491,947 | 1/1985 | Frank | 370/94.1 |
| 4,641,304 | 2/1987 | Raychaudhuri | 370/95.1 |
| 4,897,834 | 1/1990 | Peterson et al. | 370/85.1 |
| 4,937,822 | 6/1990 | Weddle et al. | 370/124 |
| 5,012,469 | 4/1991 | Sardana | 370/95.3 |
| 5,065,398 | 11/1991 | Takashima | 370/94.1 |
| 5,172,375 | 12/1992 | Kou | 370/95.3 |
| 5,181,200 | 1/1993 | Harrison | 370/85.1 |
| 5,339,316 | 8/1994 | Diepstraten | 370/85.15 |
| 5,371,734 | 12/1994 | Fischer | 370/18 |
| 5,384,777 | 1/1995 | Ahmadi et al. | 370/85.2 |
| 5,406,550 | 4/1995 | McTiffin | 370/18 |

OTHER PUBLICATIONS

D. Raychaudhuri and N.D. Wilson, "ATM-Based Transport Architecture for Multiservices Wireless Personal Communication Networks", IEEE J. on Selected Areas in Comm., vol. 12, No. 8, Oct. 1994, pp. 1401–1414.

*Primary Examiner*—Douglas W. Olms
*Assistant Examiner*—Ajit Patel
*Attorney, Agent, or Firm*—Philip J. Feig

[57] ABSTRACT

A medium access control (MAC) layer protocol is used in a wireless ATM system for integrated support of ATM services, including constant bit-rate (CBR), variable bit-rate (VBR) and available bit-rate (ABR) services. The MAC protocol supports both connectionless packet and connection-oriented virtual circuit modes, with appropriate service parameter and quality-of-services selection. A dynamic time division, multiple access/time division multiplex (TDMA/TDM) approach accommodates the service classes in an integrated manner. A supervisory MAC procedure integrates ATM ABR/VBR/CBR virtual circuits, providing burst-by-burst allocation of ABR cells and call-by-call allocation of VBR and CBR bandwidth parameters. A mechanism is provided for the dynamic allocation of subframe capacities, assignment of ABR slots based on desired queueing rules, assignment of VBR slots based on ATM traffic shaper parameters and assignment of CBR slots based on bandwidth requirements.

8 Claims, 8 Drawing Sheets

MULTISERVICES MEDIUM ACCESS CONTROL PROTOCOL FOR WIRELESS ATM SYSTEM

FIELD OF THE INVENTION

The present invention relates to wireless ATM systems and specifically to a medium access control (MAC) layer protocol used in such systems for integrated support of ATM services, including constant bit-rate (CBR), variable bit-rate (VBR) and available bit-rate (ABR) services. The MAC protocol supports both connectionless packet and connection-oriented virtual circuit modes, with appropriate service parameter and quality-of-service (QoS) selection.

BACKGROUND OF THE INVENTION

Next-generation wireless personal communication networks will be required to co-exist with fiber-optic based broadband communication networks, which should become far more ubiquitous in the near future. These broadband systems (such as B-ISDN/ATM and ATM LAN) will offer constant bit-rate (CBR), variable bit-rate (VBR), available bit-rate (ABR) and packet transport services designed to support a range of voice, data, video, and multimedia applications. In order to avoid a serious mismatch between future wireline and wireless networks, it is necessary to consider broadband wireless systems with similar service capabilities. Personal communication networks introduced into the future multimedia application scenario should provide new service features such as high- speed transmission, flexible bandwidth allocation, VBR/CBR/packet modes, quality-of-service (QoS) selection, and so forth.

The overall technical approach of the present invention is based on the recognition that ATM has recently emerged as the predominant switching and transport technology for wide and local area broadband networks to be deployed during the next several years. This means that it is desirable for the next-generation wireless personal communication network to provide similar ATM type service capabilities to the extent possible using radio medium. While certain quantitative limits on bit-rate or quality-of-service may have to be accepted for the wireless network, the availability of qualitatively equivalent service classes in a seamless manner would provide significant benefits of uniformity to network operators, service providers and terminal designers.

There are several basic: problems that must be addressed for the development of ATM-based broadband wireless networks, including:

1. High-speed radio transmission consistent with service requirements of future terminals. Typical video and multimedia services may require transmission bit-rates ~1–10 Mbps, a channel speed that is significantly higher than that being considered for first-generation wireless systems.
2. Medium access control (MAC) methods that provide relatively transparent multiservices capabilities similar to ATM over the inherently shared wireless medium. Service classes to be supported include constant bit-rate (CBR), variable bit-rate (VBR) and packet data, each with reasonable quality-of-service parameters.
3. Wireless data link protocols for interfacing the relatively unreliable high-speed radio links to the fixed broadband (ATM) network with a minimum of protocol conversion.
4. Signaling and transport protocol modifications necessary to support mobility and new personal communication services in the wireless network.

The present invention provides a solution for the wireless ATM medium access control method referred to in item 2 above.

In an article by D. Raychaudhuri et al entitled "ATM-Based Transport Architecture for Multiservices Wireless Personal Communication Networks" in IEEE Journal on Selected Areas in Communication, vol. 12, no. 8, October 1994, pages 1401 to 1414, there is a basic systems level description of a wireless ATM system. The present invention concerns a novel embodiment of a medium access control useable in systems such as that described in the Raychaudhuri et al article. Specifically, the invention describes a dynamic TDMA (time division multiple access)/TDD (time division duplexing) method for provisioning of ATM transport services on a wireless channel.

In U.S. Pat. No. 4,491,947 there is described a method for dynamic scheduling of integrated circuit switching and packet switching in a multibeam satellite switched time division multiple accessed environment. The scheduling is performed onboard the satellite by a scheduler under the direction of a controller. For each time slot, a least cost assignment is applied for each slot.

U.S. Pat. No. 4,641,304 describes a particular method of dividing time frames into message slots containing minislots for retransmission of data packets.

In U.S. Pat. No. 4,897,834 a bit oriented communications network is described where each node of the network broadcasts in time slots in a round robin fashion.

In U.S. Pat. No. 4,937,822 an adaptive time division multiple access communications system is illustrated which maintains different frequencies between nodes of a communication system. The frequency at which the transmissions are made charges according to the signal quality. The TDMA system used relies on a frequency/time slot independent of those in other time slots.

In U.S. Pat. No. 5,012,469 an adaptive hybrid multiple access protocol dynamically switches among contention (ALOHA), reservation and fixed assignment (TDMA) protocols as a function of the traffic of a channel.

In U.S. Pat. No. 5,065,398 a TDMA satellite communications arrangement is described. Data to be transmitted is divided into subpackets and then the subpackets are transmitted in predetermined time slots.

In U.S. Pat. No. 5,172,375 a combination of fixed assignment, random and demand access methods are used in a satellite communication system. In the present invention, data is transmitted by a TDMA access method.

The above patents provide a broad background of the art. Some of these patents, for example, refer to satellite systems. In general, these patents do not refer to ATM networks, multimedia applications or microcellular wireless systems.

In U.S. Pat. No. 5,384,777 there is described a medium at access control (MAC) protocol for wireless radio access for a plurality of remote stations to a base station on a LAN.

The present invention provides an advance beyond the teachings found in the above patents by providing ATM compatibility with multiservice/quality of service for services including packet ABR, UPC-based VBR or isochronous CBR. The disclosed MAC is directed at ATM compatibility at both service and cell levels which has not been achieved heretofore.

SUMMARY OF THE INVENTION

In accordance with the teachings of the present invention, a wireless ATM system is disclosed which provides a multiservices integrated framework for voice, video, data and multimedia services, while maintaining a high degree of compatibility with future broadband ISDN/ATM.

There are several technological factors which motivate the use of ATM cell transport for such a multiservices wireless network, including: flexible bandwidth allocation for a range of services; efficient multiplexing of traffic from bursty data/multimedia sources; suitability of available ATM switching techniques; ease of interfacing with wired B-ISDN systems that will form the telecommunication background, and the like. The present system adopts an ATM compatible fixed length cell-relay format.

Accordingly, a 48 byte ATM cell is the basic unit of data within the wireless network. The ATM header itself is maintained for network and higher level services in the wireless segment, although some compression may be applied to certain fields for efficiency Wireless channel specific protocol layers (e.g., data link and medium access control (MAC) layer) are added to ATM cells as required, and replaced by standard ATM headers before entering the fixed network. The overall approach is intended to minimize transcoding complexity at the base station and to provide uniform ATM services throughout the system.

The system approach is to separate network functions into a wireless ATM network interface unit (WATM NIU) responsible for wireless physical, MAC and data link layers of the wireless protocol layers. The WATM NIU is connected to either a remote terminal or a base station which provides normal ATM functions with required mobility enhancements. The remote terminal presents a standard ATM interface to the user process on the remote terminal, providing the usual service classes and parameters. Applications currently working over wired ATM will continue to work transparently on the wireless system.

The present invention resides in a novel medium access control (MAC) layer protocol used in the wireless ATM system for integrated support of ATM services, including constant bit-rate (CBR), variable bit-rate (VBR) and available bit-rate (ABR). The MAC protocol handles both connectionless packet and connection-oriented virtual circuit modes, with appropriate service parameters.

The MAC protocol used in the wireless ATM system is based on a novel dynamic time division, multiple access/time division multiplex (TDMA/TDM) approach, in which the service classes are accommodated in an integrated manner.

A principal object of the present invention is the provision of a demand assigned time division multiple access (TDMA) medium access control adapted for supporting ATM.

Another object of the invention is the provision of a time division multiple/time division multiple access (TDM/TDMA) (TDD) MAC framing and burst formats suitable for transmission of ATM cells.

A further object of the invention is the provision of a supervisory MAC procedure which integrates ATM ABR/VBR/CBR virtual circuits (VCs), providing burst-by-burst allocation of ABR cells and call-by-call allocation of VBR and CBR bandwidth parameters. This includes mechanisms for dynamic allocation of sub-frame: capacities, i.e. moving boundaries, assignment of ABR slots based on desired queueing rules (e.g. FCFS), assignment of VBR slots based on ATM traffic shaper parameters and assignment of CBR slots based on bandwidth requirements.

A still further object of the invention is the provision of a superframe structure necessary for fine-granularity allocation of VBR and CBR bandwidth.

Yet another object of the invention is the provision of uplink and downlink control mechanisms for supporting ABR, VBR and CBR MAC operations.

Further and still other objects of the present invention will become more clearly apparent when the following description is read in conjunction with the accompanying drawing.

DETAILED DESCRIPTION OF THE INVENTION

System Architecture

Figure 1:
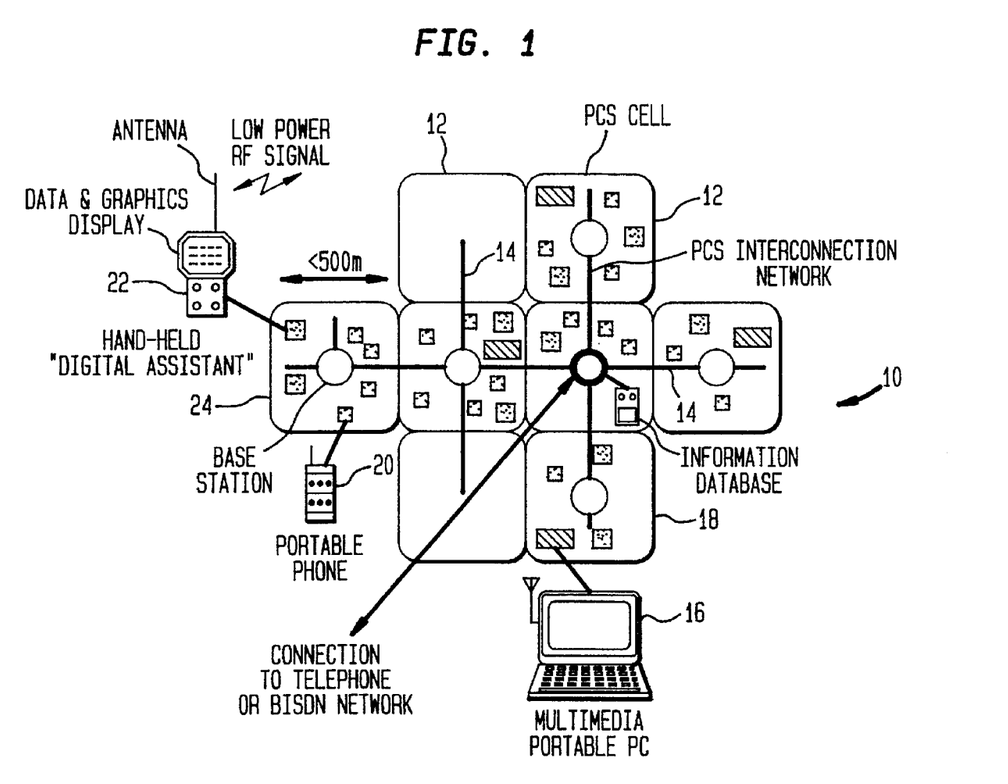
FIG. 1 is a schematic representation of a multiservices wireless network.

Referring now to the figures and to FIG. 1 in particular, there is shown an overall schematic representation of a multiservices wireless network 10. A plurality of personal communication system (PCS) cells 12 are interconnected by means of PCS Interconnection Network 14. The wireless ATM system is intended to provide a multiservices integrated framework for voice, video, data, and multimedia services, while maintaining a high degree of compatibility with future ISDN/ATN.

The network handles traffic from different types of data/multimedia sources. For illustrative purposes a multimedia portable PC 16 is shown in PCS cell 18 while a portable phone 20 and hand held digital assistant 22 are both shown in PCS cell 24. It will be apparent to those skilled in the art that multiple units may be located in the same or different cells of the network and additional kinds of voice, video, data, telecommunication and/or multimedia sources and the like may be found in the network.

Figure 2:
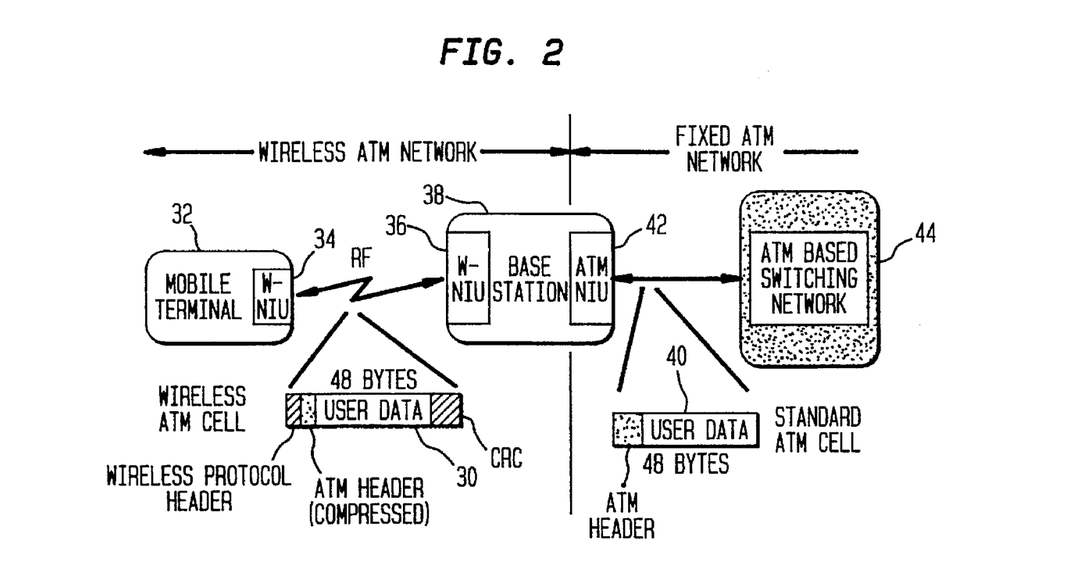
FIG. 2 is a schematic diagram of an ATM-compatible wireless network.

The use of an ATM cell transport for a multiservices wireless network leads to the adoption of an ATM compatible fixed length cell-relay format, such as shown in FIG. 2. A 48 byte wireless ATM cell 30 is the basic unit of data within the wireless network. The ATM header itself is maintained for network and higher level services in the wireless segment, although some compression may be applied to certain fields (e.g. VPI/VCI) for efficiency. Wireless channel specific protocol layers (e.g., data link and medium access control layer) are added to ATM cells as required, and replaced by standard ATM headers before entering the fixed network. This approach is intended to minimize transcoding complexity at the base station and to provide ATM services throughout the system.

In the wireless ATM network, a mobile terminal 32 including a wireless network interface unit (W-NIU) 34 transmits wireless ATM cells 30 to a corresponding W-NIU 36 contained at a base station 38. The data is converted to a standard 48 bytes ATM cell 40 and is transmitted from ATM-NIU 42 to an ATM Based Switching Network 44 for further distribution.

The protocol architecture is based on harmonization of wireless-specific functions into the standard ATM protocol stack, as shown below:

The proposed wireless ATM network follows a protocol layering harmonized with that of standard ATM. The approach adopted is to incorporate new wireless channel specific physical, medium access control (MAC), data link control (DLC) and wireless network control layers into the ATM protocol stack as shown above. This means that regular ATM network layer and control services such as E.164 or IP-over-ATM addressing, VC multiplexing, cell prioritization (CLP), explicit congestion notification (ECN), Q.2931 signaling for call establishment, etc. will continue to be used for mobile services. Of course, a limited number of mobility extensions to ATM network and control layers will be required to support additional functions such as location management, handoff, QoS specification/renegotiation, etc. Additional ATM adaption layer (AAL) options may also be considered later for customized support of wireless applications.

Figure 3:
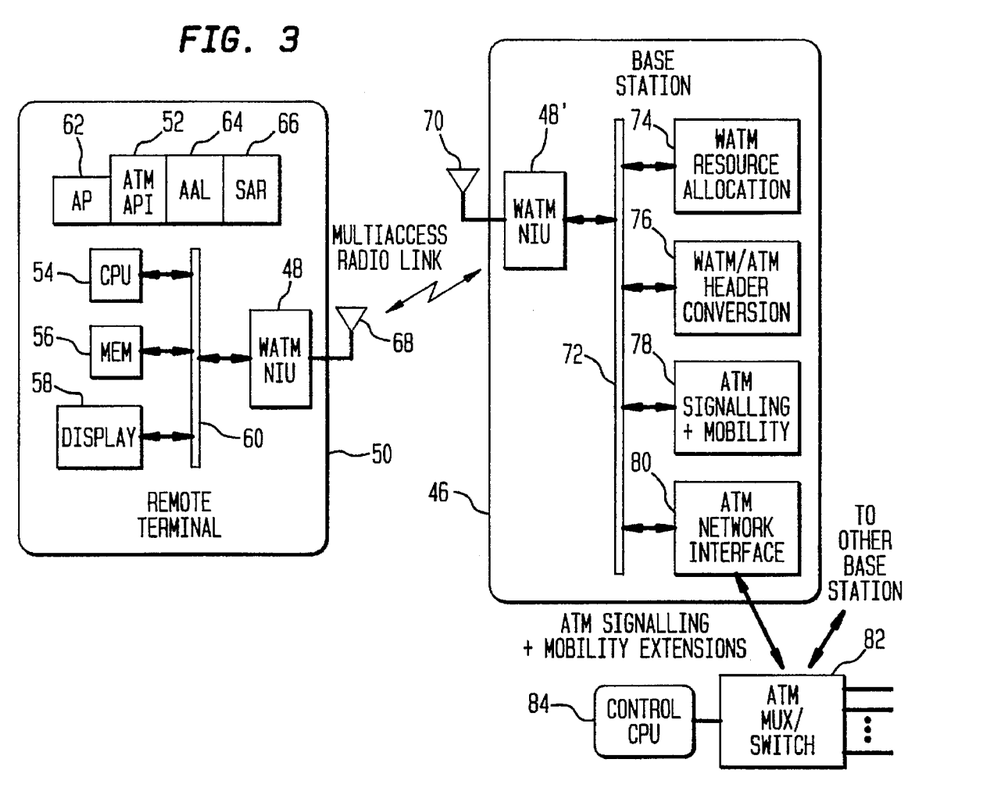
FIG. 3 is a schematic diagram of a system level implementation of a wireless ATM network.

A system level implementation of the wireless ATM network is shown in FIG. 3. The general approach relied upon is to separate network functions into a wireless ATM network interface unit (WATM NIU) responsible for wireless physical, MAC and data link layers. The WATM NIU 48, 48' is connected to either a remote terminal or a base station which provide normal ATM functions together with required mobility enhancements. The remote terminal 50 includes a standard ATM API 52 to the user process on the remote terminal, providing the usual service classes and parameters. Applications currently working over wired ATM will continue to work transparently on the wireless system.

The remote terminal 50 further includes a CPU 54, memory 56 and display 58 which are connected to WATM NIU 48 via an interconnection network 60. In addition to ATM API (Application Programming Interface) 52, an AP (Application Program) 62, AAL (ATM Adaptation Layer) 64 and SAR (Segmentation And Resegmentation) 66 are connected to CPU 54. The MAC functions which are the subject of the present invention are implemented in the WATM NIU 48.

The wireless ATM cell is transmitted from antenna 68 of the remote terminal 50 via a multiaccess radio link to antenna 70 at the base station 46. WATM NIU 48' connected to antenna 70 receives the ATM cell and provides the cell via interconnection network 72 to WATM resource allocation unit 74, WATM/ATM header conversion unit 76, ATM signalling and mobility unit 78 and ATM network interface 80. The ATM network interface is coupled to an ATM mux/switch 82 which, in turn, is controlled by a control CPU 84 for providing cells to other base stations (not shown) in response to ATM signalling and mobility extension signals.

Wireless Network Interface Unit

A typical software/firmware implementation of the wireless network interface unit (WNIU) comprises the following major modules: physical level transmitter (PHY TX), physical level receiver (PHY RX), synchronization module (SYNC), Medium Access Control (MAC) and Data Link Control (DLC). Since wireless ATM permits simultaneous operation of multiple virtual circuits (VC's), a single PHY and MAC processor connect to multiple DLC processors corresponding to each active VC on the channel.

Figure 4:
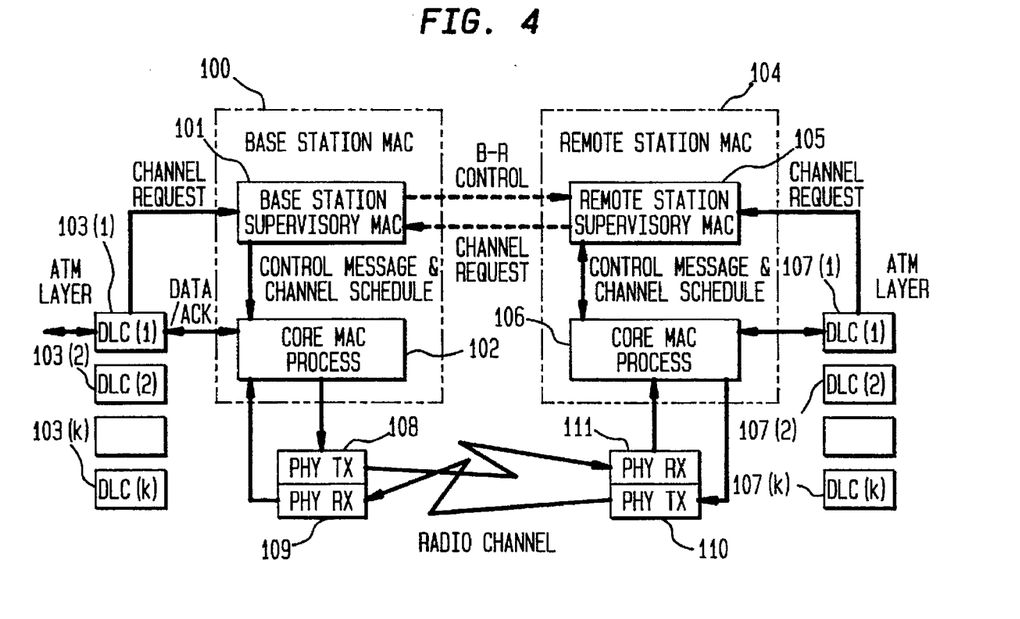
FIG. 4 is a representation of base-controlled MAC architecture.

FIG. 4 shows a base-controlled MAC architecture. A base station MAC 100 including a base station supervisory MAC 101 receives channel requests from data link controls 103 (1) ... (k) which act as an intermediate layer between the ATM layer and the MAC layer. The data link controls 103 (1) ... (k) send requests for channels to the supervisory MAC 101 which, in turn, schedules channels and sends control messages to core MAC processor 102. The DLC 103 and core MAC processor 102 exchange data and ACK signals with one another. The core MAC processor 102 also controls physical level transmitter PHY TX 108 for transmitting signals to a remote physical level receiver PHY RX 111 associated with a remote station. A receiver PHY RX 109 forwards signals received from a PHY TX transmitter 110 associated with a remote station to the core MAC processor 102.

A remote station MAC 104 includes a remote station supervisory MAC processor 105 and a core MAC processor 106. A set of DLC 107(1) ... (k) associated with the remote station MAC processor 104 send channel requests to the remote station supervisory MAC processor 105. The remote station supervisory MAC processor 105 and the core MAC processor 106 exchange control messages and channel scheduling. The DLCs 107 (1) ... (k) and core MAC processor 106 exchange data and ACK signals. The PHY TX transmitter 110 is controlled by the core MAC processor 106. The PHY RX receiver 111 provides received signals to the core MAC processor 106.

The PHY TX transmitter 110 associated with the remote MAC 104 sends signals via a radio channel to PHY RX receiver 109 associated with the base station MAC 100. Similarly, PHY TX transmitter 108 associated with base station MAC 100 sends signals to PHY RX receiver 111 associated with remote station MAC 104 via a radio channel.

Physical Layer

The present wireless ATM system is capable of operating with different physical levels that may vary in terms of bit-rate and burst acquisition performance. The basic requirement for the wireless ATM network is a burst modem with a reasonably high bit-rate (typically 10 mbps or higher) and a relatively short acquisition preamble (16 bytes or lower). The system definition permits the use of burst modems that do not fully meet the above performance goals, in which case certain service quality and channel efficiency limitations will result.

Medium Access Control (MAC) Protocol

The MAC layer protocol is capable of providing integrated support of ATM services, including constant bit-rate (CBR), variable bit-rate (VBR) and available bit-rate (ABR). The MAC protocol handles both connectionless packet and connection-oriented virtual circuit modes, with appropriate service parameters. The service classes and general service parameters envisioned by the present invention are as follows:

| Service Class | Service parameters | Quality-of-service measure |
| --- | --- | --- |
| Constant Bit-Rate (CBR) | Bandwidth: n×8 Kbps | Blocking probability<br>Cell error rate<br>Delay jitter |
| Variable Bit-Rate (VBR) | Usage parameter control:<br>peak rate (n×8 Kbps)<br>sustained rate (n×8 Kbps)<br>burst length (m cells) | Blocking probability<br>Cell error rate<br>Cell loss rate<br>Delay jitter |
| Available Bit-Rate (ABR) | None | Packet delay<br>Cell error rate<br>Cell loss rate |

Figure 5:
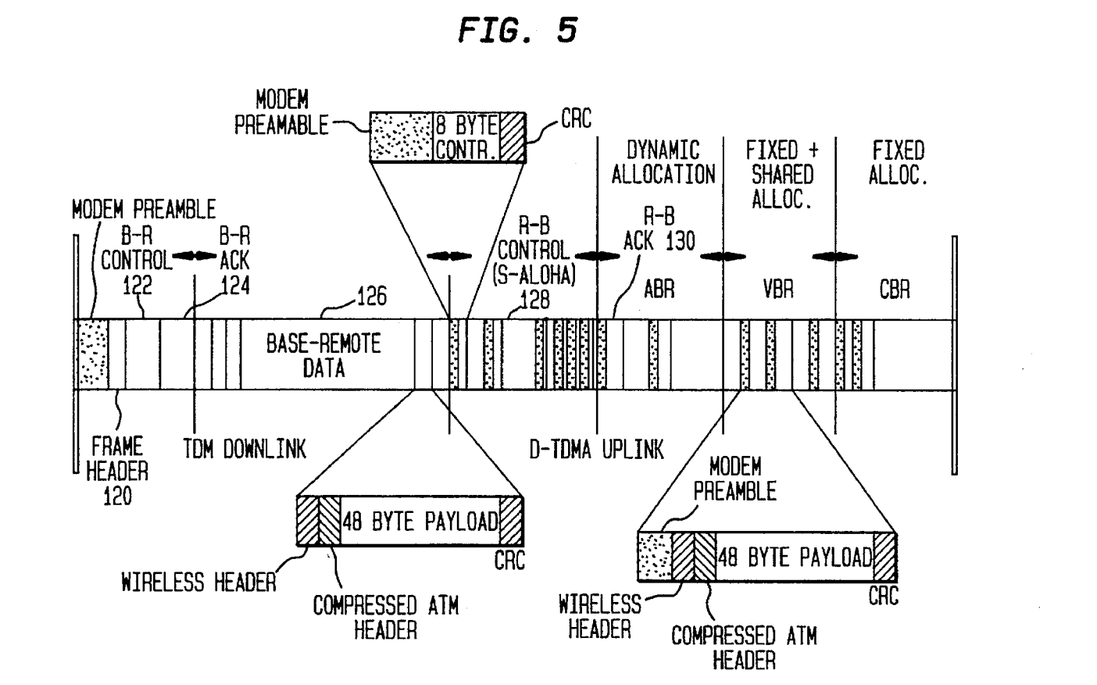
FIG. 5 is a schematic representation of a dynamic TDMA MAC framework.

The MAC protocol used in the present wireless ATM system is based on a dynamic TDMA/TDM/TDD framework, in which the above service classes are accommodated in an integrated manner. This access control method is based on framing of the channel (as shown in FIG. 5) into $T_f$ ms units which are further subdivided into $B_m$ byte slots. Uplink and downlink transmissions use the same frame in a time division duplexed manner. Downlink transmissions are TDM multiplexed in a single burst from base to remote stations, while uplink transmissions use a dynamic TDMA method. This dynamic TDMA access protocol requires each remote station to transmit a random access (slotted ALOHA) control message in the first part of the uplink subframe, retransmitting with appropriate backoff when collision is experienced. Successful uplink requests are acknowledged in a TDM control field in the next frame, along with an allocation of TDMA slot(s) for transmission (a blocking signal may be returned when suitable channel resources are unavailable). This D-TDMA MAC framework is illustrated in FIG. 5.

The nature of the slot allocation will depend on the service type: for ABR a one-time allocation of k TDMA slots is provided for that frame, while for CBR a specific sequence of j slots is allocated once every m frames until a disconnection request is received from the remote. For VBR, slots are allocated on a connection basis also, but the specific number available in a given frame may vary depending on usage parameter control (UPC) counter values and channel congestion. Note that a "superframe" concept consisting of K frames is introduced to facilitate allocation of CBR and VBR bandwidths of relatively fine granularity. For example, with $T_f$=2 ms, channel speed=8 Mbps, one ATM cell every 3 frames (i.e. 4 cells per K=12 superframe) corresponds to a CBR bandwidth allocation of 64 Kbps.

The MAC layer is based on a channel format comprising superframes, frames and slots which carry (ATM) data cells, control messages and ACK messages. A superframe consists of K>1 frames, identified by a sequence number. Further, each frame contains: (1) frame header 120 including sync, frame setup and global supervisory information; (2) base-to-remote (B→R) control 122: (3) base-to-remote (B→R)) ACK 124; (4) base-to-remote (B→R) data 126; (5) remote-to-base (R→B) control 128; (6) remote-to-base (R→B) ACK 130; (7) remote-to-base (R→B) data. Nominal frame size is set at 2ms, with frame format as shown below:

| MAC FRAME FORMAT |   |
| --- | --- |
| FRAME HEADER: (40 Bytes), including:<br>B→R modem preamble<br>Pseudo(-random synch sequence<br>Frame sequence number<br>Frame size in slots<br>Slot size in bytes<br>Subframe pointers<br>Global supervisory information | Frame parameters |
| B→R control & ACK slots | n1 × 8 Bytes |
| B→R service data cells<br>(ABR, VBR & CBR) | n2 × 8 Bytes |
| R→B control packets | n3 × 8 Bytes |
| R→B ACK packets | n4 × 8 Bytes |
| R→B ABR service data cells | n5 × 8 Bytes |
| R→B VBR service data cells | n6 × 8 Bytes |
| R→B CBR service data cells | n7 × 8 Bytes |

In the above specification, the basic unit is an 8 byte slot. The preferred design requires 2 slots (16 bytes) for preamble and 1 slot (8 bytes) for control/ACK message payload, 1 slot (8 bytes) for wireless+ATM header and 6 slots (48 bytes) for ATM payload. It should be apparent to those skilled in the art that by reducing the modem preamble and the header duration, the channel efficiency will improve.

The preferred embodiment is based on the following subframe allocations:

| Frame duration (2ms) | 250 × 8 Byte slots |
| --- | --- |
| B→R header | 5 slots |
| B→R control | 6 slots |
| B→R ACK | 5 slots |
| B→R data (ABR, VBR & CBR) | 84 slot (12 cells) |
| R→B control | 42 slots (14 pkts incl. preamble) |
| R→B data + ACK | 108 slots (12 cells incl. preamble) |
| R→B ABR | 54 slots (6 cells incl. preamble) |
| R→B CBR | 54 slots (6 cells incl. preamble) |
| R→B VBR | shared with ABR |

A preferred specification of packet formats to be used in each of the subframes specified above is as follows:

| SERVICE DATA CELL |
| --- |
| Wireless Network Header: 2 Bytes |
| Type: 4 bits |
| Control: 4 bits |
| Cell Sequence Number: 8 bits |
| ATM Header: |
| Option 1: Standard ATM layer header (4 bytes)<br>(does not include PHY level HEC byte) |
| Option 2: Compressed ATM layer header (2 bytes) |
| VCI* (12 bits) |
| PTI (3 bits), CLP (1 bit) |
| *VCI rule for wireless segment: 8 LSB's=MAC, 4 MSB's=VC |
| Service Data payload: 48 Bytes |
| CRC-16 |

| BASE-REMOTE CONTROL PACKET |
| --- |
| Control Message Header: 2 Bytes |
| Type: 4 bits |
| VCI: 12 bits |
| Control Message: 4 Bytes |
| Control commands include: |
| Allocate ABR (up/dn, frame #, slot #, # slots) |
| Allocate VBR (up/dn, frame #, frame interval, slot #, # slots) |

-continued

BASE-REMOTE CONTROL PACKET

Allocate CBR (up/dn, frame #, frame interval, slot #, # slots)
Reallocate ABR/VBR/CBR retransmission
Call blocked
Disconnect active VCI
Handoff request acknowledgment
Initiate handoff (frequency, power, . . .)
Set power level
Set frequency
etc.
CRC-16

REMOTE-BASE CONTROL PACKET

Control Message Header: 2 Bytes
Type: 4 bits
VCI: 12 bits
Control Message: 4 Bytes
Control commands include:
Register (random #)
Request ABR (# cells, QoS)
Request VBR (UPC, QoS)
Request CBR (BW, QoS)
Reallocate CBR/VBR
Disconnect active VCI
Handoff request
Request power level
Request frequency
etc.
CRC-16

ACK PACKETS

ACK Message Header: 2 Bytes
Type: 4 bits
VCI: 12 bits
ACK Message: 4 Bytes
ACK mode selection: 4 bits
Reference CSN: 8 bits
ACK bit-map: 20 bits
CRC-16

Medium Access Control Implementation

Figure 6:
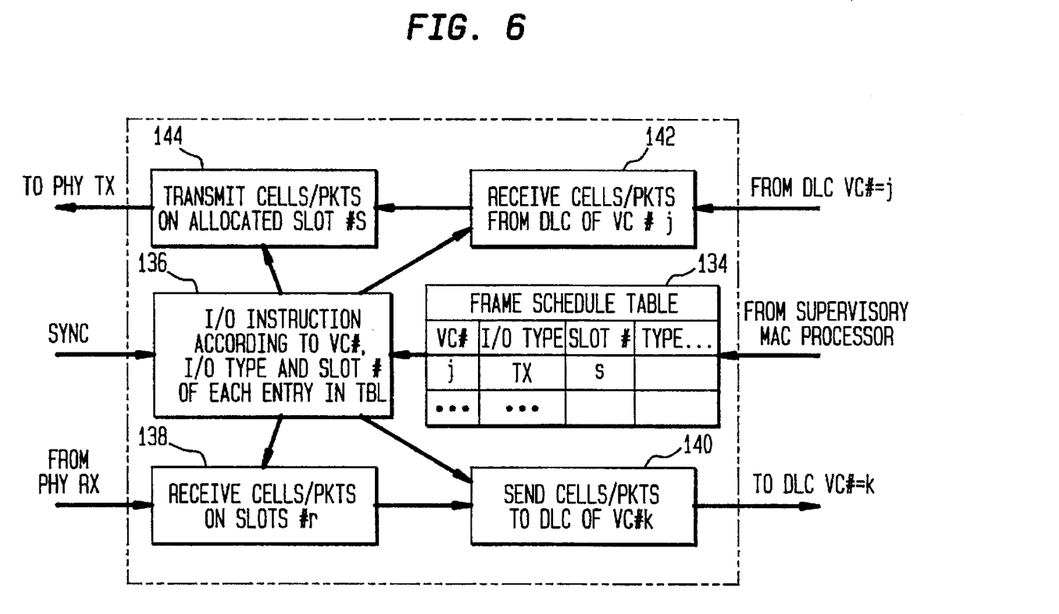
FIG. 6 is a schematic representation of core MAC protocol functions.
Figure 7:
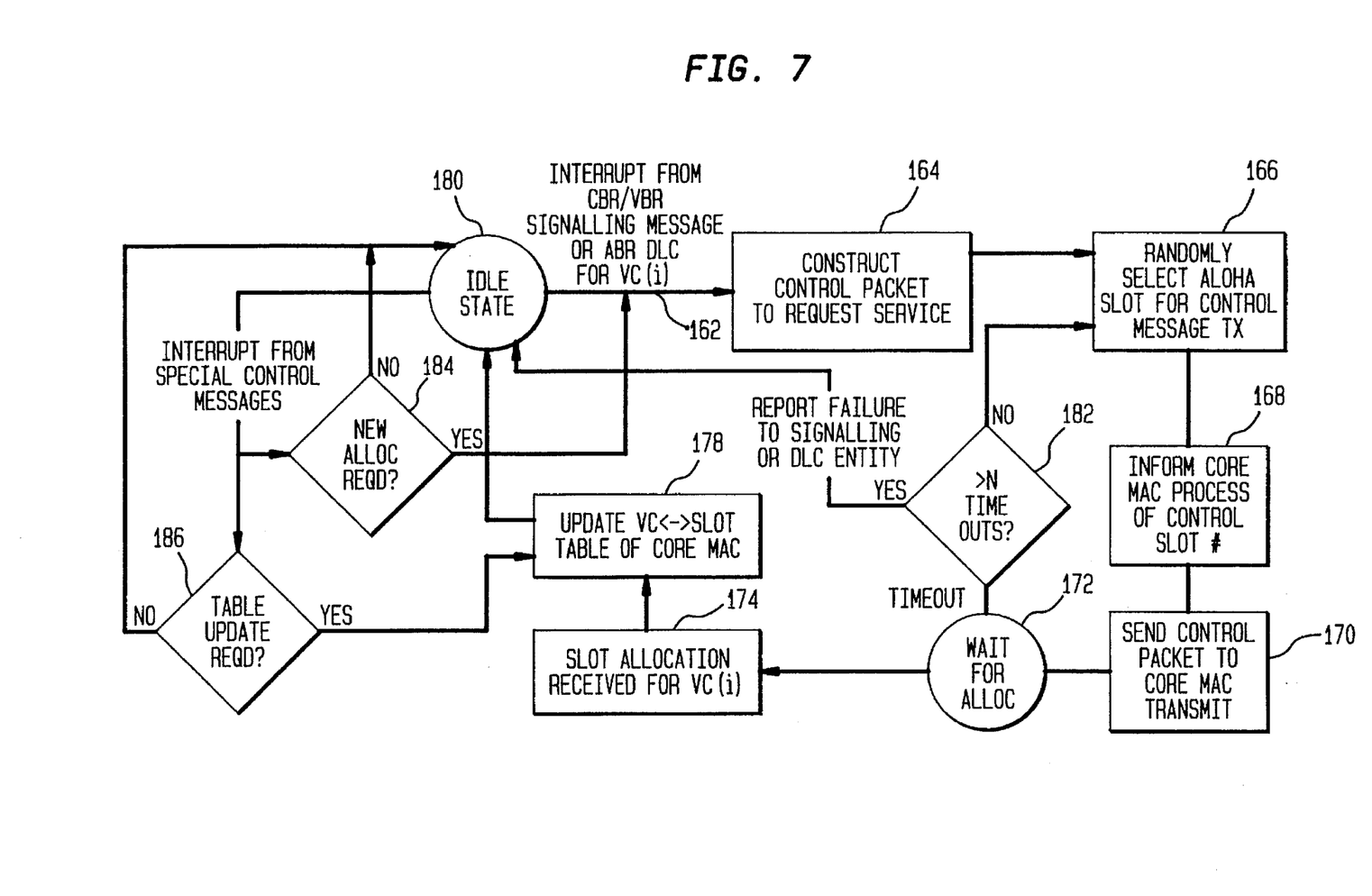
FIG. 7 is a schematic representation of major functions of the remote MAC supervisory processor.
Figure 8:
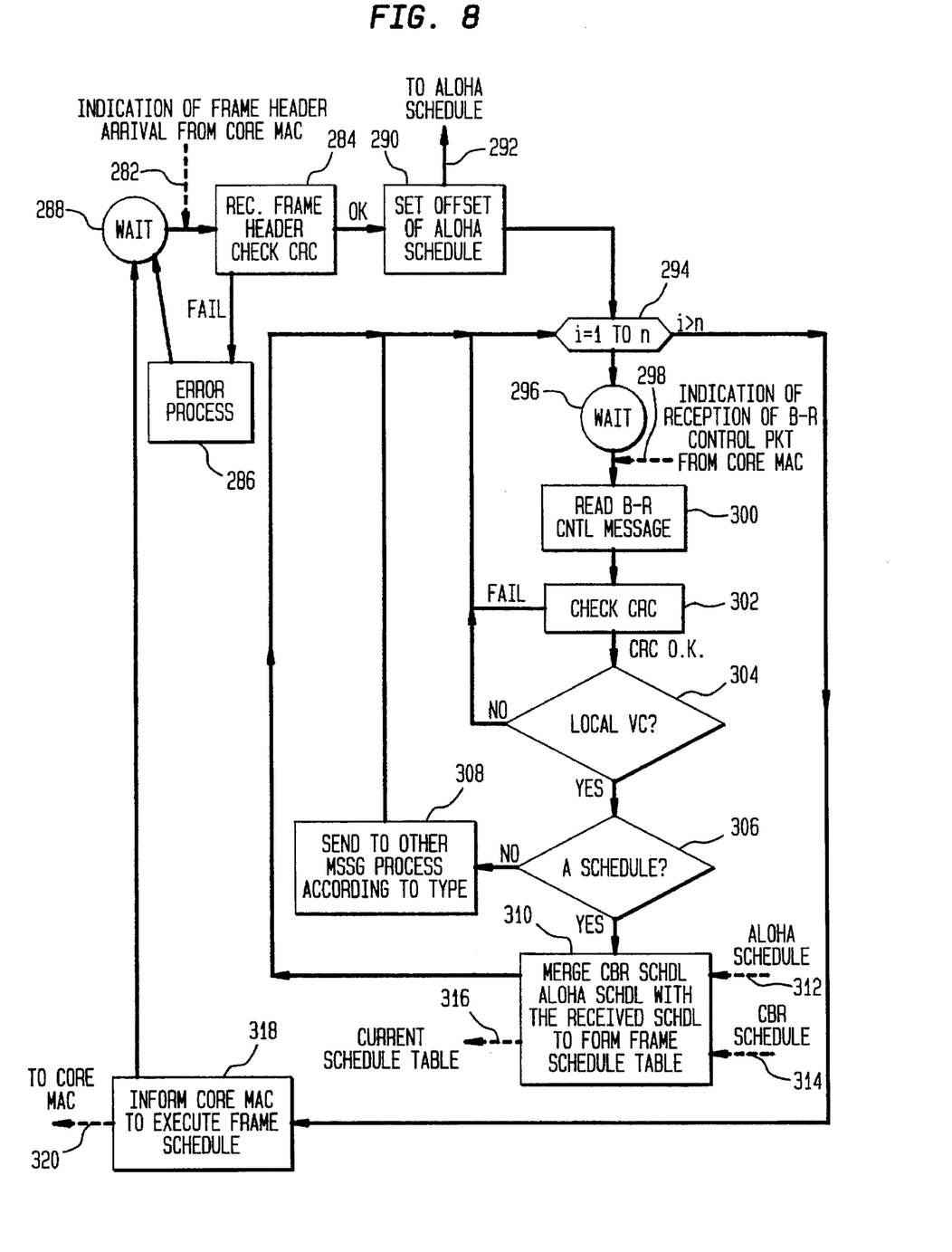
FIG. 8 is a flow diagram of a scheduling process for a remote supervisory MAC processor.
Figure 9:
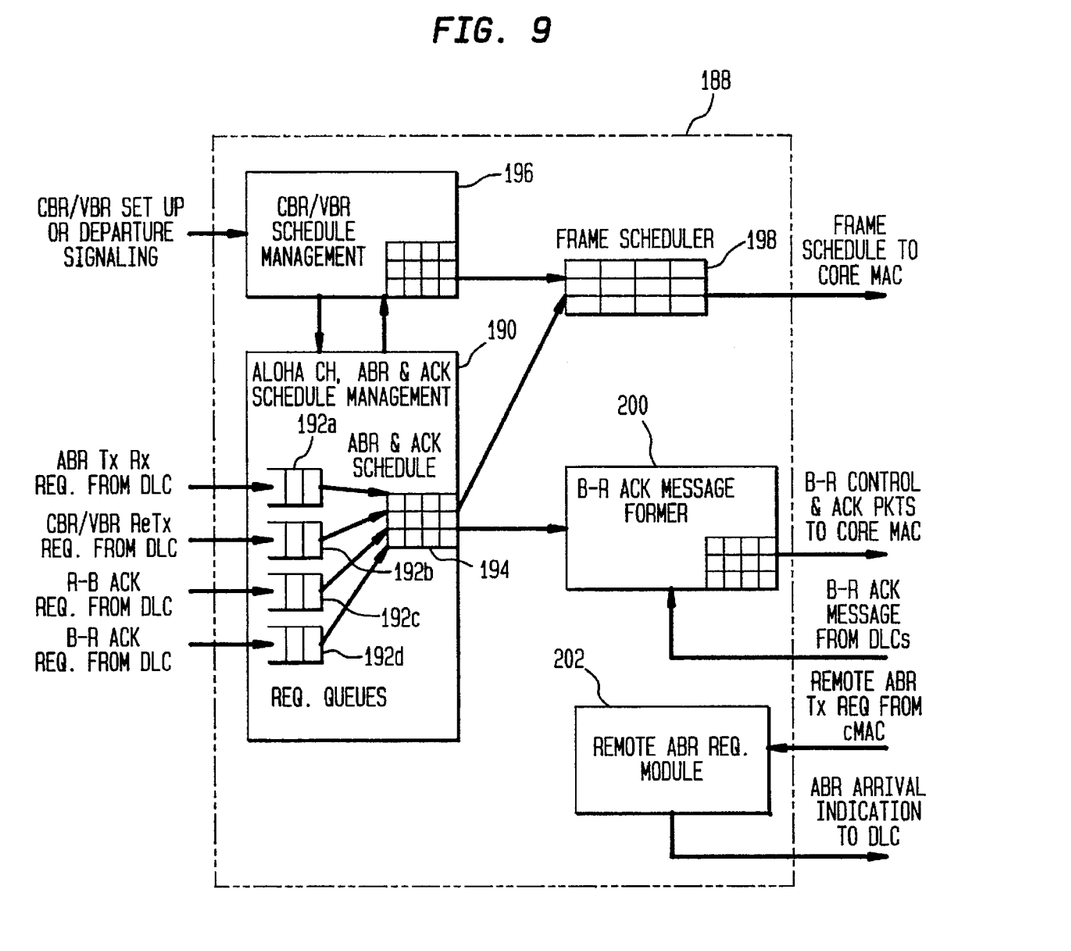
FIG. 9 is a schematic representation of major functions of the base station MAC supervisory processor.

The wireless ATM MAC protocol layer can be described in terms of two major modules: Core MAC processor and Supervisory MAC processor, as shown in FIGS. 6, 7, 8 and 9. The core MAC processor, shown in FIG. 6, is responsible for maintaining an active VC table and mapping VCs to specific control or service slots allocated to them on a frame-by-frame basis. The supervisory MAC process is responsible for higher level slot allocation logic necessary for determining the table entries in the core MAC process. The result is that at the remote terminal, the supervisory process shown in FIG. 7 is responsible for slotted ALOHA access control logic of control messages, and for interpretation of certain access control messages received from the base stations supervisory MAC process. FIG. 8 shows the schedule processes for remote supervisory MAC. At the base station, the supervisory process shown in FIG. 9 is responsible for resource allocation/queue management on both the TDM downlink and TDMA uplink. That is, the base supervisory process must divide channel time between ABR, VBR, CBR and control/ACK traffic, and then maintain specified queue management policies for resource sharing within each of these services. This type of separation between (fast) core MAC functions and (slower, more logic intensive) supervisory MAC functions provides a reasonable basis for hardware/software partitioning in the present invention.

A schematic representation of core MAC protocol functions is shown in FIG. 6. The MAC processor is common to both base and remote stations.

In FIG. 6, data from a supervisory MAC processor is provided to a frame schedule table 134. The data from table 134 and a sync signal are provided to a controller 136. The controller provides I/O instruction for each VC as well as I/O type and slot number in accordance with the data received from table 134. The controller sends a signal to receiver unit 138 to receive cells/packets on slot #r from PHY RX receiver. The receiver unit 138 sends the received cells/packets to a transmitter 140 for forwarding to the DLC for VC #k upon receipt of a signal by transmitter 140 from controller 136.

A receiver 142 receives cells/packets from a DLC on VC #j upon receipt of a signal from controller 136. The received cells/packets are forwarded to transmitter 144 for subsequent transmission on allocated slot #s upon receipt of a signal by transmitter 144 from controller 136. The transmitted cells are provided to a PHY TX transmitter for transmission via a radio channel to another station.

FIG. 7 shows the major functions of a remote MAC supervisory processor. Upon receipt of an interrupt from CBR/VBR signalling message or ABR DLC for VC(i) 162 a control packet to request service is constructed 164. An ALOHA slot for control message tx is randomly selected 166. The core MAC processor is informed of the control slot number 168. The control packet is sent to core MAC for transmission 170. The packet waits for slot allocation 172. When a slot allocation is received for VC(i) 174, the packet is ready for sending. The VC→slot table of the core MAC is updated 178 and the processor returns to its idle state 180.

If timeout occurs before a slot allocation is received, a decision 182 is made whether there is more than a predetermined number (N) of time slots. If yes, a failure report is made to a signalling or DLC entity and the processor returns to its idle state 180. If not more than N timeouts have occurred, a new ALOHA slot is randomly selected 166 and the process continues as described above.

While in the idle state 180, when the interrupt 162 is received, a first decision is made whether a new slot allocation is required 184. If no, the process returns to idle 180. If yes, a control packet is constructed 164 and the process continues a described above.

Next, a decision 186 is made whether the VC→slot table requires update. If no, the processor resumes its idle state 180. If yes, the table of core MAC is updated 178 and then the process returns to its idle state 180.

A flow diagram of a scheduling process for a remote supervisory MAC processor is shown in FIG. 8. Upon receipt of an indication of a frame header arrival from core MAC processor 282, the header is received and the CRC is checked 284. If the CRC fails, there is an error 286 and the process returns to the wait state 288. If the frame header is correct, the offset of the Aloha schedule is set 290 and the appropriate signal 292 is sent for Aloha scheduling.

The index i is incremented 294 and the process enters a wait state 296 until there is an indication of the receipt of a Base-to-Remote control packet from the core MAC processor 298. Then, the Base-to-Remote control message is read 300. The CRC is checked 302. If the CRC check fails, the process returns to step 294. If the CRC check is correct, a determination is made if there is local VC 04. If not, the process returns to step 294. If the control is sent to a local VC, a determination is made whether there is a ABR schedule 306. If not, it is sent to other message processors according to message type 308. The process then returns to step 294. If there is a ABR schedule, the CBR schedule and the Aloha schedule are merged with the receive ABR schedule to form a frame schedule table 310. The Aloha schedule 312 and the CBR schedule 314 are received for the merge step 310. The process returns to step 294. A current schedule table signal is sent 316.

From the output of step 294, the index i is provided to indicate the ith B→R control packets (total number is n). The process then returns to wait state 288 until next frame header's arrival. A signal 320 to execute is sent to core MAC processor.

The base station's MAC supervisory processor is responsible for resource allocation/queue management on both the TDM downlink and TDMA uplink. This process divides channel time between ABR, VBR and CBR and performs queue management for each service class with specified service disciplines, etc.

In FIG. 9, the major functions of a base station supervisory MAC processor 188 are shown. An Aloha channel, ABR and ACK schedule manager 190 receives as inputs ABR TxRx request from a DLC, CBR/VBR ReTx request from a DLC, Remote-to-Base ACK request from a DLC and a Base-to-Remote ACK request from a DLC. Each of these inputs is entered into a request queue 192a, 192b, 192c and 192d for each respective signal. The outputs of the request queues 192 are provided to ABR and ACK scheduler 194. An appropriate output of manager 190 is provided to CBR/VBR schedule manager 196. The CBR/VBR schedule manager 196 also receives CBR/VBR setup or departure signals. The output of manager 196 is provided as a first input to a frame scheduler 198. The other input to frame scheduler 198 is an output from ABR and ACK scheduler 194 in manager 190. The output of frame scheduler 198 is a frame schedule signal from the supervisory MAC processor to the core MAC processor.

Another output of the schedule manager 190 is provided as a first ACK schedule input to a Base-to-Remote ACK message former 200. Another input to the Base-to-Remote ACK message former 200 is a Base-to-Remote ACK message from a DLC according to the ACK schedule. The output of the Base-to-Remote ACK message former are Base-to-Remote control and ACK packets to the core MAC processor.

Also included in the base supervisory MAC processor 188 is a remote ABR request module 202 which receives as an input a remote ABR Tx Request from the core MAC processor located in a remote station. The output of the module 202 is a remote ABR arrival indication signal to a DLC.

Figure 10:
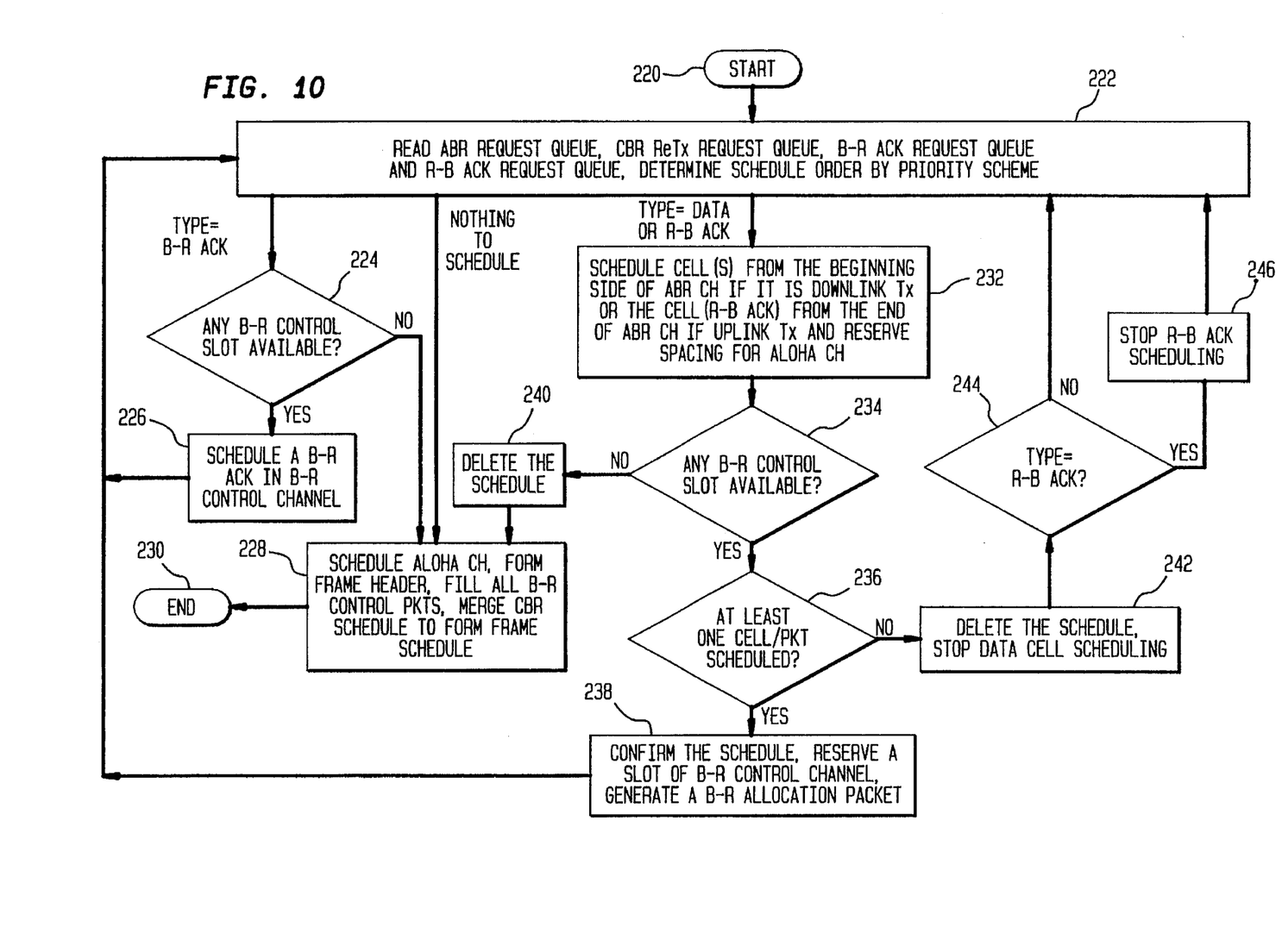
FIG. 10 is a flow diagram of an Aloha channel, ABR and ACK schedule manager.

The different modules contained in the base supervisory MAC processor will now be described. FIG. 10 is a flow diagram of the Aloha channel, ABR and ACK schedule manager 190. Commencing at start 220, the ABR request queue 192a, CBR/VBR ReTx request queue 192b (Also, VBR additional Tx request may be sent to this queue), Base-to-Remote ACK request queue 192d and Remote-to-Base ACK request queue 192c are read and a schedule order is determined based upon a predetermined priority scheme in step 222.

If a Base-to-Remote ACK request is present, a determination is made whether there are any Base-to-Remote control slots available 224. If there is a slot, a Base-to-Remote ACK is scheduled in the Base-to-Remote control channel 226 and the manager returns to read and determine step 222. If there are no slots available, all Base-to-Remote control packets are filed to partially form a frame schedule in step 228. Then, the process ends at step 230.

If there is data or a Remote-to-Base ACK request, cells are scheduled from the beginning of the ABR channel if there is a downlink Tx transmission or the cells (Remote-to-Base ACK) from the end of the ABR channel if there is an uplink Tx transmission and spacing for an Aloha channel is reserved in step 232.

A determination is made whether there are any Base-to-Remote control slots available 234. If there is a control slot available, a determination is made whether there is at least one cell or packet scheduled 236. If so, the schedule is confirmed, a slot of the Base-to-Remote control channel is reserved and a Base-to-Remote allocation packet is generated in step 238 and the system returns to step 222.

If there is no Base-to-Remote control slot available at step 234, the schedule is deleted at step 240 and the process continues to step 228.

If no cell or packet is scheduled at step 236, the schedule is deleted and data cell scheduling is stopped at step 242. A determination is made whether this is a Remote-to-Base ACK request 244. If not, the process returns to step 222. If it is a Remote-to-Base ACK request, Remote-to-Base ACK signal scheduling is stopped 246 and the process returns to step 222.

Figure 11:
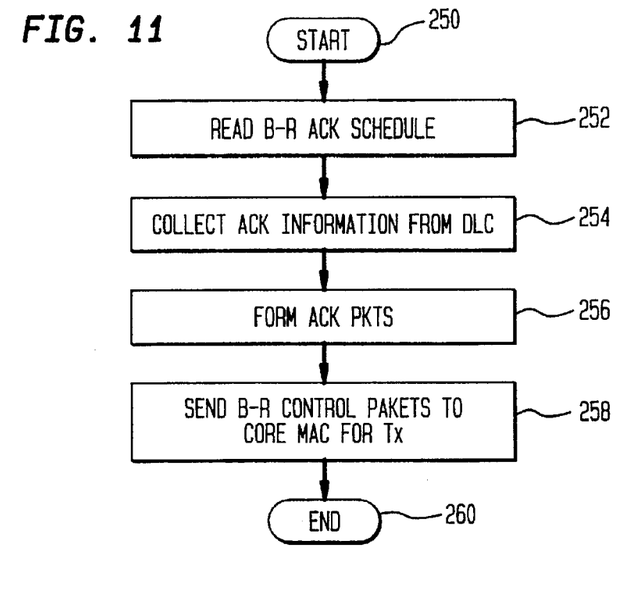
FIG. 11 is a flow diagram of a Base-to-Remote message format.

A flow diagram of the Base-to-Remote message former 200 is shown in FIG. 11. After start 250, the Base-to-Remote ACK schedule from manager 190 is read 252. ACK information is collected from the DLC 254. ACK packets are formed 256. The Base-to-Remote control packets are sent to the core MAC processor for transmission 258 and then the process ends 260.

Figure 12:
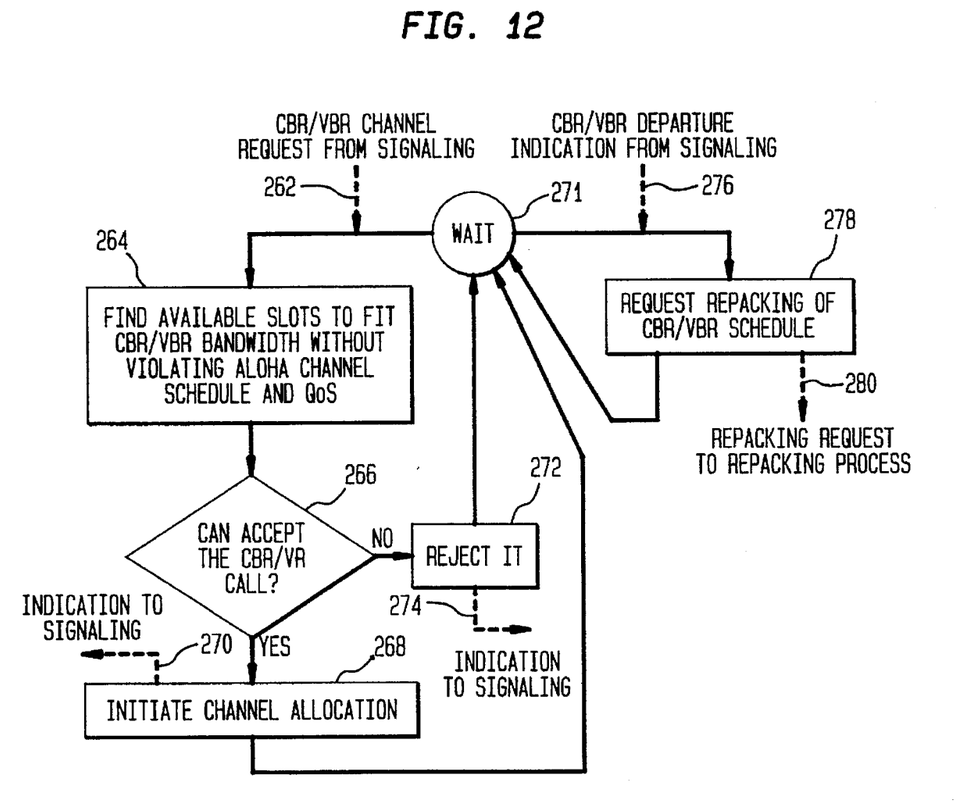
FIG. 12 is a flow diagram of a CBR schedule manager.

A flow diagram of the CBR/VBR schedule manager 196 is shown in FIG. 12. Upon receipt of a CBR/VBR channel request signal 262 from signaling or from a radio control, an attempt is made to find available slots to fit the CBR/VBR bandwidth without violating Aloha channel schedule and QoS requirements in step 264. In a preferred embodiment, VBR calls are allocated in a manner similar to CBR at peak bit rate. A determination is made whether it is possible to accept the CBR/VBR signal 266. If yes, channel allocation is initiated in step 268 and a signal is sent to signaling or to a radio control accordingly 270. The process returns to its wait state 271.

If the base cannot accept the CBR/VBR signal, the request 262 is denied in step 272 and an appropriate signal 274 is sent. The process returns to wait state 271.

When a CBR/VBR departure or end indication signal 276 is received, a request to repack the CBR/VBR schedule is made 278 and an appropriate signal 280 is sent. The process then returns to wait state 271.

The base station MAC supervisory processor may implement a range of traffic control disciplines for ABR, VBR and CBR to provide congestion control and quality-of-service guarantees. The specific queue management algorithms used will depend upon performance versus complexity trade-offs appropriate for the service scenario. Since the specific algorithms used do not affect MAC/Data Link layer overall operations, they may be viewed as user options which may be added in software.

While there has been described and illustrated a preferred wireless ATM system and specifically a medium access control for use in such a system, it will be apparent to those skilled in the art that variations and modifications are possible without deviating from the broad spirit and principles of the invention which shall be limited solely by the scope of the claims appended hereto.

What is claimed is:

1. A wireless ATM communication system for transmitting data packets via wireless link comprising:

a base station;

at least one remote station; and medium access control means for controlling the transmission of data packets between said base station and said at least one remote station via wireless link comprising:

framing a channel into $T_f$ ms units subdivided into $B_m$ byte slots which carry ATM control and data messages where downlink transmissions are TDM multiplexed in a single burst from said base station to said at least one remote station and uplink transmissions use a dynamic TDMA methodology slot allocation from said at least one remote station to said base station.

2. A wireless ATM communication system as set forth in claim 1 where said TDMA slot allocation for available bit-rate data is a one-time allocation of k TDMA slots for a frame, where k is an integer.

3. A wireless ATM communication system for transmitting data packets via wireless link comprising:

a base station;

at least one remote station;

medium access control means for controlling the transmission of data packets between said base station and said at least one remote station via wireless link comprising:

framing a channel into $T_f$ ms units subdivided into $B_m$ byte slots where downlink transmissions are TDM multiplexed in a single burst from said base station to said at least one remote station and uplink transmissions for TDMA slot allocation for continuous bit-rate data is a specific sequence of slots allocated once every m frames until a disconnect request is received by said base station from said at least one remote station, where j and m are integers.

4. A wireless ATM communication system as set forth in claim 1, where said TDMA slot allocation for variable bit-rate data is made on a connection basis and is dependent on usage parameter control values and channel congestion.

5. A wireless ATM communication system for transmitting data packets via wireless link comprising:

a base station;

at least one remote station; and medium access control means for controlling the transmission of data packets between said base station and said at least one remote station via wireless link comprising:

framing a channel into $T_f$ ms units subdivided into $B_m$ byte slots where downlink transmissions are TDM multiplexed in a single burst from said base station to said at least one remote station and uplink transmissions use a dynamic TDMA methodology for slot allocation from said at least one remote station to said base station;

further comprising a superframe for slot allocation for continuous bit-rate data and variable bit-rate data, where said superframe comprises a plurality of flames identified by a sequence number and where each frame of said plurality of frames comprises a frame header, frame setup and global supervisory information, base-to-remote control signal, base-to remote ACK signal, base to remote data, remote-to-base control signal, and remote-to-base data.

6. A wireless ATM communication system for transmitting data packets via wireless link comprising:

a base station;

at least one remote station;

core medium access control means for controlling the transmission between said base station and said at least one remote station by maintaining an active virtual channel table and mapping virtual channels to specific control or service slots allocated on a frame-by-frame basis, and supervisory medium access control means for determining table entries in said core medium access control means.

7. A wireless ATM communication system as set forth in claim 6, where said supervisory medium access control means in said at least one remote station provides ALOHA access control logic of control messages.

8. A wireless ATM communication system as set forth in claim 6, where said supervisory medium access control means in said base station allocates and queues resources for time division multiplex downlink transmissions from said base station to said at least one remote station and TDMA uplink transmissions from said at least one remote station to said base station.

* * * * *